United States Patent [19]
Fujino et al.

[11] Patent Number: 4,749,668
[45] Date of Patent: Jun. 7, 1988

[54] DIELECTRIC CERAMIC COMPOSITION

[75] Inventors: Masaru Fujino, Nagaokakyo; Goro Nishioka, Ibaraki; Yukio Sakabe, Kyoto, all of Japan

[73] Assignee: Murata Manufacturing Co., Ltd., Japan

[21] Appl. No.: 58,991

[22] Filed: Jun. 8, 1987

[30] Foreign Application Priority Data

Jun. 9, 1986 [JP] Japan .................. 61-134701

[51] Int. Cl.$^4$ .......................... C04B 35/46
[52] U.S. Cl. ................... 501/134; 501/135; 501/136
[58] Field of Search ............ 501/134, 135, 136; 252/62.9

[56] References Cited

U.S. PATENT DOCUMENTS

| | | | |
|---|---|---|---|
| 4,216,103 | 8/1980 | Fujiwara et al. | 501/134 |
| 4,339,544 | 7/1982 | Sakabe et al. | 501/136 |
| 4,544,644 | 10/1985 | Yamashita | 501/134 |

FOREIGN PATENT DOCUMENTS

| | | | |
|---|---|---|---|
| 59-105208 | 6/1984 | Japan | 501/135 |
| 60-151272 | 8/1985 | Japan | 501/134 |

Primary Examiner—William R. Dixon, Jr.
Assistant Examiner—Anthony J. Green
Attorney, Agent, or Firm—Ostrolenk, Faber, Gerb & Soffen

[57] ABSTRACT

A dielectric ceramic composition consisting essentially of a solid solution of a main component of a ternary system $Pb(Ni_{1/3}Nb_{2/3})O_3$-$Pb(Zn_{1/3}Nb_{2/3})O_3$-$Pb(Mg_{1/3}Nb_{2/3})O_3$, and additional components composed of $PbTiO_3$ and a complex perovskite compound of the general formula: $A(Mn_{1/2}Nb_{1/2})O_3$ (wherein A is at least one element selected from the group consisting of Pb, Ba, Sr and Ca). The composition may further contain as an additional components, a complex perovskite compound expressed by the general formula: $B(Cu_{1/2}W_{1/2})O_3$ wherein B is at least one element selected from the group consisting of Pb, Ba, Sr and Ca. The main component consisting essentially of 66.53 to 67.27 Wt % of $Pb_3O_4$, 25.79 to 26.08 wt % of $Nb_2O_5$, 1.47 to 5.09 wt % of NiO, 2.00 to 5.49 wt % of ZnO and 0.02 to 1.19 wt % of MgO and having a composition expressed by the general formula:

$$xPb(Ni_{1/3}Nb_{2/3})O_3\text{-}yPb(Zn_{1/3}Nb_{2/3})O_3\text{-}zPb(Mg_{1/3}Nb_{2/3})O_3$$

(wherein x, y and z are percentages by weight of the respective three components and have the following values: $20.0 \leq x \leq 70.0$, $25.0 \leq y \leq 69.5$, and $0.5 \leq z \leq 30.0$). The contents of the respective additional components per 100 parts by weight of the main component are, 0.5 tp 7.0 parts by weight for $PbTiO_3$, 0.1 to 5.0 parts by weight for $A(Mn_{1/2}Nb_{1/2})O_3$, not more than 5.0 parts by weight for $B(Cu_{1/2}W_{1/2})O_3$, respectively.

15 Claims, 1 Drawing Sheet

DIELECTRIC CERAMIC COMPOSITION

FIELD OF THE INVENTION

The present invention relates to a dielectric ceramic composition and, more particularly, a dielectric ceramic composition having a high dielectric constant of not less than 6000, a low change rate of capacitance with temperature and a low sintering temperature ranging from 900° to 1000° C.

BACKGROUND OF THE INVENTION

As high permittivity dielectric ceramic composition for ceramic capacitors, there have been used those mainly comprising barium titanate. Among these some barium titanate ceramic compositions have a change rate of capacitance with temperature ($\Delta C/C_{20}$) which satisfies D standards specified in JIS-C-6422 (i.e., $\Delta C/C_{20} = +20\%$ to $-30\%$ at a temperature ranging from $-25°$ C. to $+85°$ C.), but their dielectric constant at room temperature is low and 5000 at the maximum.

In addition, these compositions have a high sintering temperature ranging from 1300° to 1400° C. Thus, the sintering of such compositions results in an increase in cost of the ceramic products. Also, when such ceramic compositions are used as a dielectric material for monolithic ceramic capacitors, it is required to use expensive noble metals such as, for example, palladium and platinum as a material for internal electrodes. The monolithic ceramic capacitors are generally manufactured by the steps of forming ceramic green sheets, screening internal electrodes on each ceramic green sheet, stacking and pressing the green sheets, and then firing the resultant monolithic bodies, and it is required to prevent the internal electrodes from melting, from oxidation or from reaction with dielectrics during sintering.

On the other hand, it has been known that dielectric ceramic compositions of a complex perovskite type lead compound has a high dielectric constant of not less than 10000 and a sintering temperature of not more than 1100° C. However, such compositions have a large change rate of capacitance with temperature.

SUMMARY OF THE INVENTION

It is therefore an object of the present invention to provide a dielectric ceramic composition with a high dielectric constant and a small change rate of capacitance with temperature, and that can be sintered at a low temperature of not more than 1000° C. to prevent the evaporation of lead.

According to the present invention, the above and other objects are achieved by providing a dielectric ceramic composition consisting essentially of a solid solution of a main component which is the ternary system $Pb(Ni_{\frac{1}{3}}Nb_{\frac{2}{3}})O_3\text{-}Pb(Zn_{\frac{1}{3}}Nb_{\frac{2}{3}})O_3\text{-}Pb(Mg_{\frac{1}{3}}Nb_{\frac{2}{3}})O_3$, and additional components composed of $PbTiO_3$ and a complex perovskite compound of the general formula: $A(Mn_{\frac{1}{3}}Nb_{\frac{2}{3}})O_3$ (wherein A is at least one element selected from the group consisting of Pb, Ba, Sr and Ca), said main component consisting essentially of 66.53 to 67.27 wt% of $Pb_3O_4$, 25.79 to 26.08 wt% of $Nb_2O_5$, 1.47 to 5.09 wt% of NiO, 2.00 to 5.49 wt% of ZnO and 0.02 to 1.19 wt% of MgO and having a composition expressed by the general formula:

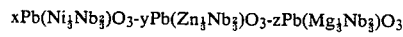

$$xPb(Ni_{\frac{1}{3}}Nb_{\frac{2}{3}})O_3\text{-}yPb(Zn_{\frac{1}{3}}Nb_{\frac{2}{3}})O_3\text{-}zPb(Mg_{\frac{1}{3}}Nb_{\frac{2}{3}})O_3$$

(wherein x, y and z are percentages by weight of the respective three components and take the following values: $20.0 \leq x \leq 70.0$, $25.0 \leq y \leq 69.5$, and $0.5 \leq z \leq 30.0$), the contents of the respective additional components per 100 parts by weight of the main component being 0.5 to 7.0 parts by weight for $PbTiO_3$ and 0.1 to 5.0 parts by weight for $A(Mn_{\frac{1}{3}}Nb_{\frac{2}{3}})O_3$, respectively.

The dielectric ceramic composition according to the present invention may further contain, as an additional components, a complex perovskite compound expressed by the general formula:

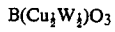

$$B(Cu_{\frac{1}{2}}W_{\frac{1}{2}})O_3$$

wherein B is at least one element selected from the group consisting of Pb, Ba, Sr and Ca. Preferably, the content of $B(Cu_{\frac{1}{2}}W_{\frac{1}{2}})O_3$ is not more than 5.0 parts by weight per 100 parts by weight of the main component.

DETAILED DESCRIPTION OF THE INVENTION

The dielectric ceramic composition according to the present invention comprises a solid solution of a main component of a ternary system $Pb(Ni_{\frac{1}{3}}Nb_{\frac{2}{3}})O_3\text{-}Pb(Zn_{\frac{1}{3}}Nb_{\frac{2}{3}})O_3\text{-}Pb(Mg_{\frac{1}{3}}Nb_{\frac{2}{3}})O_3$, which consists essentially of 66.53 to 67.27 wt% of $Pb_3O_4$, 25.79 to 26.08 wt% of $Nb_2O_5$, 1.47 to 5.09 wt% of NiO, 2.00 to 5.49 wt% of ZnO and 0.02 to 1.19 wt% of MgO and has a composition expressed by the general formula:

$$xPb(Ni_{\frac{1}{3}}Nb_{\frac{2}{3}})O_3\text{-}yPb(Zn_{\frac{1}{3}}Nb_{\frac{2}{3}})O_3\text{-}zPb(Mg_{\frac{1}{3}}Nb_{\frac{2}{3}})O_3$$

(wherein x, y and z are percentages by weight of the respective three components and takes the following values: $20.0 \leq x \leq 70.0$, $25.0 \leq y \leq 69.5$, and $0.5 \leq z \leq 30.0$).

In other words, the main component has a composition falling on lines defined by the points A, B, C and D or falling in a compositional area defined by a polygon ABCD encompassed by the points A, B, C and D in FIG. 1, the sets of percentages by weight of the three components at said points being as follows:

|   | x | y | z |
| --- | --- | --- | --- |
| A | 50.0 | 25.0 | 25.0 |
| B | 20.0 | 50.0 | 30.0 |
| C | 30.0 | 69.5 | 0.5 |
| D | 70.0 | 29.5 | 0.5 |

The dielectric ceramic composition of the present invention contains, as additional components, 0.5 to 7.0 parts by weight of $PbTiO_3$, 0.1 to 5.0 parts by weight of $A(Mn_{\frac{1}{3}}Nb_{\frac{2}{3}})O_3$ and not more than 5.0 parts by weight of $B(Cu_{\frac{1}{2}}W_{\frac{1}{2}})O_3$ per 100 parts by weight of the main component.

The main component $Pb(Ni_{\frac{1}{3}}Nb_{\frac{2}{3}})O_3\text{-}Pb(Zn_{\frac{1}{3}}Nb_{\frac{2}{3}})O_3\text{-}Pb(Mg_{\frac{1}{3}}Nb_{\frac{2}{3}})O_3$ per se has a high dielectric constant, but it has a large change rate of capacitance with temperature and a high sintering temperature. The change rate of capacitance with temperature can be decreased by the incorporation of $PbTiO_3$ and the complex perovskite compound $A(Mn_{\frac{1}{3}}Nb_{\frac{2}{3}})O_3$ (wherein A is at least one element selected from the group consisting of Pb, Ba, Sr and Ca). On the other hand, the sintering temperature of the main component can be lowered by the incorporation of the complex perovskite compound $B(Cu_{\frac{1}{2}}W_{\frac{1}{2}})O_3$.

The dielectric ceramic composition according to the present invention has a high dielectric constant of not less than 6000, a low dielectric loss (tan δ) of less than 1%, a low sintering temperature ranging from 900° to 1000° C. and the change rate of capacitance with temperature which satisfies D standards specified in JIS-C-6422.

The main component of the dielectric ceramic compositions of the present invention has been limited to the one having a composition falling in the area defined by the polygon ABCD for the following reasons: If the main component has a composition falling in a point outside of the side AB, the dielectric constant becomes small and less than 6000.

If the main component has a composition falling in a point outside of the side BC, the dielectric constant becomes small and less than 6000 and the dielectric loss (tan δ) exceeds 1%. In addition, this makes it impossible to produce ceramic capacitors with the change rate of capacitance with temperature which satisfies D standards specified in JIS-C-6422.

If the main component has a composition falling in a point outside of the side CD, the sintering temperature exceeds 1000° C. and the dielectric constant becomes small and less than 6000.

If the main component has a composition falling in a point outside of the side DA, the dielectric constant becomes small and less than 6000 and the change rate of capacitance with temperature does not satisfy D standards specified JIS-C-6422.

The contents of the additional components have been limited to the above respective ranges for the following reasons: If the content of $PbTiO_3$ is less than 0.5 parts by weight or exceeds 7 parts by weight per 100 parts by weight of the main component, the dielectric constant becomes less than 6000 and the change rate of capacitance with temperature does not satisfy D standards specified JIS-C-6422.

If the content of $A(Mn_{\frac{1}{3}}Nb_{\frac{2}{3}})O_3$ (wherein A is at least one element selected from the group consisting of Pb, Ba, Sr and Ca) is less than 0.1 parts by weight per 100 parts by weight of the main component, the sintering temperature becomes higher than 1000° C., and the specific resistance becomes less than $10^{12}$ Ω-cm at 25° C. and less than $10^{11}$ Ω-cm at 85° C. If the content of $A(Mn_{\frac{1}{3}}Nb_{\frac{2}{3}})O_3$ exceeds 5.0 parts by weight, the dielectric constant becomes less than 6000.

If the content of $B(Cu_{\frac{1}{2}}W_{\frac{1}{2}})O_3$ (wherein B is at least one element selected from the group consisting of Pb, Ba, Sr and Ca) exceeds 5.0 parts by weight per 100 parts by weight of the main component, the dielectric constant becomes less than 6000 and the change rate of capacitance with temperature does not satisfy D standards specified in JIS-C-6422.

The invention will be further apparent from the following description with reference to examples and the accompanying drawing.

EXAMPLES

Figure 1:
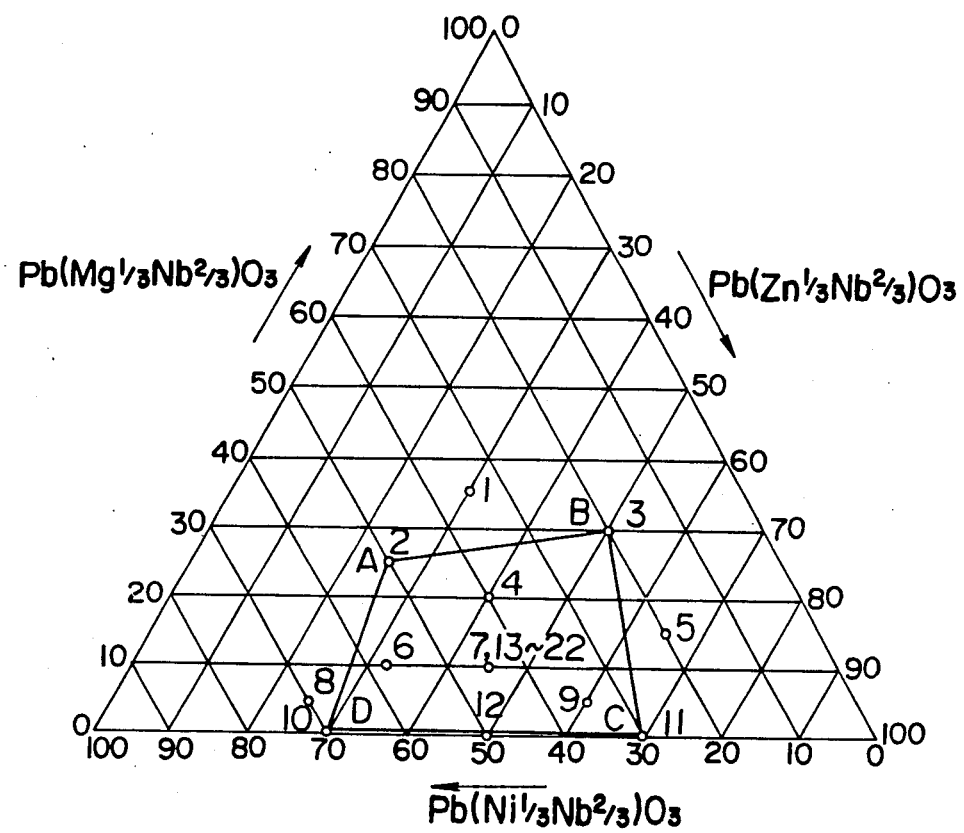
FIG. 1 is a triangular diagram showing a compositional area of the main component of the dielectric ceramic composition of the present invention.

Using $Pb_3O_4$, $Nb_2O_5$, NiO, ZnO, MgO, $TiO_2$, $MnO_2$, $BaCO_3$, $SrCO_3$, $CaCO_3$, CuO and $WO_3$ as starting materials, there were respectively prepared mixtures of the starting materials for preparation of $Pb(Ni_{\frac{1}{3}}Nb_{\frac{2}{3}})O_3$, $Pb(Zn_{\frac{1}{3}}Nb_{\frac{2}{3}})O_3$, $Pb(Mg_{\frac{1}{3}}Nb_{\frac{2}{3}})O_3$, $PbTiO_3$, $Pb(Mn_{\frac{1}{3}}Nb_{\frac{2}{3}})O_3$, $Ba(Mn_{\frac{1}{3}}Nb_{\frac{2}{3}})O_3$, $Sr(Mn_{\frac{1}{3}}Nb_{\frac{2}{3}})O_3$, $Ca(Mn_{\frac{1}{3}}Nb_{\frac{2}{3}})O_3$, $Pb(Cu_{\frac{1}{2}}W_{\frac{1}{2}})O_3$ $Ba(Cu_{\frac{1}{2}}W_{\frac{1}{2}})O_3$ $Sr(Cu_{\frac{1}{2}}W_{\frac{1}{2}})O_3$ and $Ca(Cu_{\frac{1}{2}}W_{\frac{1}{2}})O_3$. Each mixture was respectively calcined for 2 hours, crushed and milled to prepare calcined powder. The calcination was carried out at 950° C. for $PbTiO_3$ or at 750° C. for the other compounds. The resultant powder was weighed to prepare mixture having compositional ratios shown in Table 1, and then ball milled by the wet process together with 5 parts by weight of polyvinyl alcohol binder. In Table 1, x is the percentage by weight of $Pb(Ni_{\frac{1}{3}}Nb_{\frac{2}{3}})O_3$, y is that of $Pb(Zn_{\frac{1}{3}}Nb_{\frac{2}{3}})O_3$ and Z is that of $Pb(Mg_{\frac{1}{3}}Nb_{\frac{2}{3}})O_3$. The amounts of the additional components are represented by parts by weight per 100 parts by weight of the main component.

Each of the resultant mixtures was dried, granulated and then pressed into disks with a diameter of 10 mm and a thickness of 1.2 mm under a pressure of 2000 Kg/cm². The disks were fired with an electric furnace in a lead atmosphere at a temperature shown in Table 2 for 2 hours to prepare ceramic disks. The resultant ceramic disks were applied on the opposite sides with silver paste and the baked at 800° C. to form baked-on electrodes.

The thus prepared test specimens were subjected to electrical property measurements. The measurements were made on dielectric constant (ε) and dielectric loss tangent (tan δ) under the conditions of 1 KHz, 1 Vrms and 20° C. The change rate of capacitance with temperature was determined by values of capacitance measured at −25° C., +20° C., and +85° C. and given by the equation:

$$\frac{(C_t - C_{20})}{C_{20}} \times 100 \, (\%)$$

where $C_t$ is the measured value of capacitance at −25° C. or +85° C. and $C_{20}$ is that at +20° C.

The specific resistance was determined by applying a voltage of 500 V between two electrodes at 25° C. and 85° C. Results are shown in Table 2. In the tables, the specimens with an asterisk (*) are those have a composition beyond the scope of the present invention.

TABLE 1

| | $xPb(Ni_{\frac{1}{3}}Nb_{\frac{2}{3}})O_3$—$yPb(Zn_{\frac{1}{3}}Nb_{\frac{2}{3}})O_3$—$zPb(Mg_{\frac{1}{3}}Nb_{\frac{2}{3}})O_3$ | | | | | | | | Additional components (parts by weight) | | |
|---|---|---|---|---|---|---|---|---|---|---|---|
| | Ratio of x, y, z (wt %) | | | Ratio of oxides in main components (wt %) | | | | | | A(Mn,Nb)$O_3$ | B(Cu,W)$O_3$ |
| No. | x | y | z | $Pb_3O_4$ | $Nb_2O_5$ | NiO | ZnO | MgO | $PbTiO_3$ | A | B |
| 1* | 35.0 | 30.0 | 35.0 | 67.48 | 26.16 | 2.57 | 2.40 | 1.39 | 1.5 | Pb 1.0 | Ba 2.0 |
| 2 | 50.0 | 25.0 | 25.0 | 67.27 | 26.08 | 3.66 | 2.00 | 0.99 | 3.5 | Ba 2.0 | Sr 1.5 |
| 3 | 20.0 | 50.0 | 30.0 | 67.27 | 26.08 | 1.47 | 3.99 | 1.19 | 4.0 | Sr 3.5 | Pb 4.0 |
| 4 | 40.0 | 40.0 | 20.0 | 67.09 | 26.01 | 2.92 | 3.19 | 0.79 | 6.5 | Pb 1.5 | Pb 2.5 |
| 5* | 20.0 | 65.0 | 15.0 | 66.87 | 25.92 | 1.46 | 5.16 | 0.59 | 2.5 | Pb 2.0 | Ca 3.0 |
| 6 | 57.5 | 32.5 | 10.0 | 66.90 | 25.94 | 4.19 | 2.58 | 0.39 | 4.0 | Ca 3.5 | Sr 0.5 |

TABLE 1-continued

| | xPb(Ni₁Nb₃)O₃—yPb(Zn₁Nb₃)O₃—zPb(Mg₁Nb₃)O₃ | | | | | | | | Additional components (parts by weight) | | |
|---|---|---|---|---|---|---|---|---|---|---|---|
| | Ratio of x, y, z (wt %) | | | Ratio of oxides in main components (wt %) | | | | | | A(Mn,Nb)O₃ | B(Cu,W)O₃ |
| No. | x | y | z | $Pb_3O_4$ | $Nb_2O_5$ | NiO | ZnO | MgO | $PbTiO_3$ | A | B |
| 7 | 45.0 | 45.0 | 10.0 | 66.84 | 25.92 | 3.28 | 3.57 | 0.39 | 5.0 | Ba 0.5 | Pb 4.0 |
| 8* | 70.0 | 25.0 | 5.0 | 66.82 | 25.90 | 5.10 | 1.98 | 0.20 | 6.5 | Pb 1.5 | Pb 3.0 |
| 9 | 35.0 | 60.0 | 5.0 | 66.66 | 25.85 | 2.54 | 4.75 | 0.20 | 1.0 | Pb 4.0 | Ba 1.5 |
| 10 | 70.0 | 29.5 | 0.5 | 66.70 | 25.86 | 5.09 | 2.33 | 0.02 | 2.0 | Sr 5.0 | Pb 0.5 |
| 11 | 30.0 | 69.5 | 0.5 | 66.53 | 25.79 | 2.17 | 5.49 | 0.02 | 3.5 | Pb 1.5 | Sr 3.5 |
| 12* | 50.0 | 50.0 | 0 | 66.60 | 25.82 | 3.63 | 3.95 | 0 | 1.5 | Ca 0.5 | Pb 2.0 |
| 13* | 45.0 | 45.0 | 10.0 | 66.84 | 25.92 | 3.28 | 3.57 | 0.39 | 0 | Pb 3.0 | Pb 2.0 |
| 14 | 45.0 | 45.0 | 10.0 | 66.84 | 25.92 | 3.28 | 3.57 | 0.39 | 3.0 | Pb 3.0 | Pb 2.0 |
| 15* | 45.0 | 45.0 | 10.0 | 66.84 | 25.92 | 3.28 | 3.57 | 0.39 | 7.5 | Pb 3.0 | Pb 2.0 |
| 16* | 45.0 | 45.0 | 10.0 | 66.84 | 25.92 | 3.28 | 3.57 | 0.39 | 2.5 | — 0 | Pb 2.5 |
| 17 | 45.0 | 45.0 | 10.0 | 66.84 | 25.92 | 3.28 | 3.57 | 0.39 | 2.5 | Pb 2.5 | Pb 2.5 |
| 18* | 45.0 | 45.0 | 10.0 | 66.84 | 25.92 | 3.28 | 3.57 | 0.39 | 2.5 | Pb 5.5 | Pb 2.5 |
| 19 | 45.0 | 45.0 | 10.0 | 66.84 | 25.92 | 3.28 | 3.57 | 0.39 | 2.5 | Pb 3.0 | — 0 |
| 20 | 45.0 | 45.0 | 10.0 | 66.84 | 25.92 | 3.28 | 3.57 | 0.39 | 2.5 | Pb 3.0 | Pb 3.0 |
| 21* | 45.0 | 45.0 | 10.0 | 66.84 | 25.92 | 3.28 | 3.57 | 0.39 | 2.5 | Pb 3.0 | Pb 5.5 |
| 22 | 45.0 | 45.0 | 10.0 | 66.84 | 25.92 | 3.28 | 3.57 | 0.39 | 5.0 | Ba 0.5 | Pb 4.0 |

TABLE 2

| No. | Sintering temp. (°C.) | ε at 25° C. | tan δ (%) | Specific resistance (Ω-cm) | | Change rate of Capacitance, ΔC/C₂₀ (%) | |
|---|---|---|---|---|---|---|---|
| | | | | at 25° C. | at 85° C. | −25° C. | +85° C. |
| 1* | 950 | 4820 | 0.73 | $5.9 \times 10^{12}$ | $6.3 \times 10^{11}$ | −29.1 | −25.3 |
| 2 | 900 | 6310 | 0.49 | $7.3 \times 10^{12}$ | $8.1 \times 10^{11}$ | −20.3 | −29.0 |
| 3 | 930 | 6390 | 0.86 | $4.2 \times 10^{12}$ | $5.4 \times 10^{11}$ | −28.8 | −23.1 |
| 4 | 930 | 7380 | 0.75 | $6.9 \times 10^{12}$ | $7.3 \times 10^{11}$ | −28.4 | −25.1 |
| 5* | 950 | 3880 | 2.08 | $8.4 \times 10^{12}$ | $8.5 \times 10^{11}$ | −41.1 | −16.8 |
| 6 | 980 | 7410 | 0.44 | $1.9 \times 10^{13}$ | $1.3 \times 10^{12}$ | −25.3 | −27.6 |
| 7 | 980 | 8990 | 0.76 | $7.8 \times 10^{12}$ | $7.9 \times 10^{11}$ | −23.4 | −25.9 |
| 8* | 930 | 4280 | 0.33 | $6.2 \times 10^{12}$ | $6.8 \times 10^{11}$ | −18.9 | −40.1 |
| 9 | 950 | 8090 | 0.88 | $1.6 \times 10^{13}$ | $1.7 \times 10^{12}$ | −28.9 | −22.0 |
| 10 | 980 | 6210 | 0.44 | $4.3 \times 10^{12}$ | $5.4 \times 10^{11}$ | −20.9 | −27.6 |
| 11 | 950 | 6290 | 0.95 | $9.8 \times 10^{12}$ | $8.9 \times 10^{11}$ | −29.4 | −20.9 |
| 12* | 1100 | 4890 | 0.70 | $7.3 \times 10^{12}$ | $6.4 \times 10^{11}$ | −26.9 | −25.3 |
| 13* | 980 | 4410 | 0.59 | $6.5 \times 10^{12}$ | $6.9 \times 10^{11}$ | −19.5 | −37.5 |
| 14 | 950 | 8310 | 0.73 | $4.9 \times 10^{12}$ | $3.9 \times 10^{11}$ | −25.4 | −28.0 |
| 15* | 930 | 4230 | 0.91 | $8.1 \times 10^{12}$ | $7.9 \times 10^{11}$ | −38.9 | −15.3 |
| 16* | 1050 | 6200 | 0.71 | $7.3 \times 10^{10}$ | $6.3 \times 10^{9}$ | −23.3 | −28.4 |
| 17 | 950 | 8190 | 0.68 | $6.4 \times 10^{12}$ | $7.1 \times 10^{11}$ | −25.1 | −26.9 |
| 18* | 950 | 4460 | 0.73 | $7.3 \times 10^{12}$ | $8.9 \times 10^{11}$ | −23.8 | −27.4 |
| 19 | 980 | 7210 | 0.66 | $9.4 \times 10^{12}$ | $8.8 \times 10^{11}$ | −21.9 | −28.7 |
| 20 | 900 | 7890 | 0.63 | $7.8 \times 10^{12}$ | $6.9 \times 10^{12}$ | −22.9 | −28.9 |
| 21* | 930 | 4270 | 0.68 | $6.4 \times 10^{12}$ | $7.1 \times 10^{11}$ | −17.1 | −35.2 |
| 22 | 980 | 9010 | 0.73 | $6.9 \times 10^{12}$ | $7.4 \times 10^{11}$ | −23.7 | −26.4 |

From the results shown in Table 2, it will be seen that the dielectric ceramic compositions falling on the side AB, BC, CD or DA or falling in the compositional area defined by the polygon ABCD have a high dielectric constant of not less than 6000, a low dielectric loss (tan δ) of less than 1%, a low sintering temperature ranging from 900° to 1000° C. and the change rate of capacitance with temperature which satisfies D standards specified in JIS-C-6422.

In the foregoing examples, the dielectric ceramic compositions were prepared by the use of the previously prepared complex perovskite compounds but it is also possible to manufacture dielectric ceramic compositions with the similar dielectric characteristics in the manner wherein raw materials such as oxides, carbonates of respective elements are weighed, mixed and then calcined at 750° C. for 2 hours.

What I claim is:

1. A dielectric ceramic composition consisting essentially of a solid solution of a main component of a ternary system Pb(Ni₁Nb₃)O₃-Pb(Zn₁Nb₃)O₃-Pb(Mg₁Nb₃)O₃, and additional components comprising PbTiO₃ and a complex perovskite compound of the general formula: A(Mn₁Nb₃)O₃ wherein A is at least one element selected from the group consisting of Pb, Ba, Sr and Ca, said main component consisting essentially of 66.53 to 67.27 wt% of Pb₃O₄, 25.79 to 26.08 wt% of Nb₂O₅, 1.47 to 5.09 wt% of NiO, 2.00 to 5.49 wt% of ZnO and 0.02 to 1.19 wt% of MgO and having a composition expressed by the general formula:

xPb(Ni₁Nb₃)O₃-yPb(Zn₁Nb₃)O₃-zPb(Mg₁Nb₃)O₃ wherein x, y and z are percentages by weight of the respective three components and take the following values: $20.0 \leq x \leq 70.0$, $25.0 \leq y \leq 69.5$, and $0.5 \leq z \leq 30.0$, the contents of the respective additional components per 100 parts by weight of the main component being 0.5 to 7.0 parts by weight for PbTiO₃ and 0.1 to 5.0 parts by weight for A(Mn₁Nb₃)O₃, respectively.

2. The dielectric ceramic composition according to claim 1 further containing, a complex perovskite compound expressed by the general formula:

$$B(Cu_{\frac{1}{2}}W_{\frac{1}{2}})O_3$$

wherein B is at least one element selected from the group consisting of Pb, Ba, Sr and Ca, the content of $B(Cu_{\frac{1}{2}}W_{\frac{1}{2}})O_3$ being not more than 5.0 parts by weight per 100 parts by weight of the main component.

3. The dielectric ceramic composition according to claim 2 in which the amount of $PbTiO_3$ is 1 to 6.5 parts.

4. The dielectric ceramic composition according to claim 3 in which A is calcium.

5. The dielectric ceramic composition according to claim 3 in which A is lead and the amount of $A(Mn_{\frac{1}{3}}Nb_{\frac{2}{3}})O_3$ is 1.5–4 parts.

6. The dielectric ceramic composition according to claim 3 in which A is barium and the amount of $A(Mn_{\frac{1}{3}}Nb_{\frac{2}{3}})O_3$ is 0.5–2 parts.

7. The dielectric ceramic composition according to claim 3 in which A is strontium and the amount of $A(Mn_{\frac{1}{3}}Nb_{\frac{2}{3}})O_3$ is 3.5–5 parts.

8. The dielectric ceramic composition according to claim 3 in which B is barium.

9. The dielectric ceramic composition according to claim 3 in which B is strontium and the amount of $B(Cu_{\frac{1}{2}}W_{\frac{1}{2}})O_3$ is 0.5–3.5 parts.

10. The dielectric ceramic composition according to claim 3 in which B is lead and the amount of $B(Cu_{\frac{1}{2}}W_{\frac{1}{2}})O_3$ is 0.5–4 parts.

11. The dielectric ceramic composition according to claim 1 in which the amount of $PbTiO_3$ is 1 to 6.5 parts.

12. The dielectric ceramic composition according to claim 11 in which A is calcium.

13. The dielectric ceramic composition according to claim 11 in which A is lead and the amount of $A(Mn_{\frac{1}{3}}Nb_{\frac{2}{3}})O_3$ is 1.5–4 parts.

14. The dielectric ceramic composition according to claim 11 in which A is barium and the amount of $A(Mn_{\frac{1}{3}}Nb_{\frac{2}{3}})O_3$ is 0.5–2 parts.

15. The dielectric ceramic composition according to claim 11 in which A is strontium and the amount of $A(Mn_{\frac{1}{3}}Nb_{\frac{2}{3}})O_3$ is 3.5–5 parts.

* * * * *